US006674564B2

(12) United States Patent
Vernackt et al.

(10) Patent No.: US 6,674,564 B2
(45) Date of Patent: Jan. 6, 2004

(54) SYSTEM, METHOD AND ARTICLE OF MANUFACTURE FOR A BEAM SPLITTING ACOUSTO-OPTICAL MODULATOR

(75) Inventors: Marc Vernackt, Overmere (BE); Pierre M. G. M. Craen, Libin (BE)

(73) Assignee: ManiaBarco, Inc., South Windsor, CT (US)

( * ) Notice: Subject to any disclaimer, the term of this patent is extended or adjusted under 35 U.S.C. 154(b) by 0 days.

(21) Appl. No.: 09/882,362

(22) Filed: Jun. 15, 2001

(65) Prior Publication Data
US 2002/0191264 A1 Dec. 19, 2002

(51) Int. Cl.[7] .................................................. G02F 1/33
(52) U.S. Cl. ........................ 359/311; 359/313; 359/314; 359/305; 359/310
(58) Field of Search ................................ 359/311, 237, 359/312, 310, 313, 314, 305, 285, 322, 323; 600/437, 447; 367/7

(56) References Cited

U.S. PATENT DOCUMENTS 3,609,009 A  *  9/1971  Lohman et al. ............. 359/310
5,949,572 A  *  9/1999  Kouta ........................ 359/305
5,963,569 A  *  10/1999 Baumgart et al. ............ 372/28

* cited by examiner

Primary Examiner—Hung Xuan Dang
Assistant Examiner—Tuyen Tra
(74) Attorney, Agent, or Firm—Dov Rosenfeld; Inventek

(57) ABSTRACT

A system, method and article of manufacture is disclosed that provides an improved, more efficient, laser beam modulator and splitter. The combined device includes a crystal with a horizontal cross-sectional shape of a pentagon. The crystal includes a top surface, a bottom surface, and a first through fifth sides. The first side and the second side are substantially parallel. An absorber is mounted on the third side. The fourth and fifth sides are substantially opposite to the third side. The fourth and fifth sides form an angle substantially equal to 180 degrees minus the sum of a first a second Bragg angles. The crystal also includes at least one layer. For one embodiment, each layer includes an incident window on the first side, an active window on the second side and a transparent axis between the incident window and the active window. A first and a second transducer are mounted on the fourth and fifth sides.

3 Claims, 10 Drawing Sheets

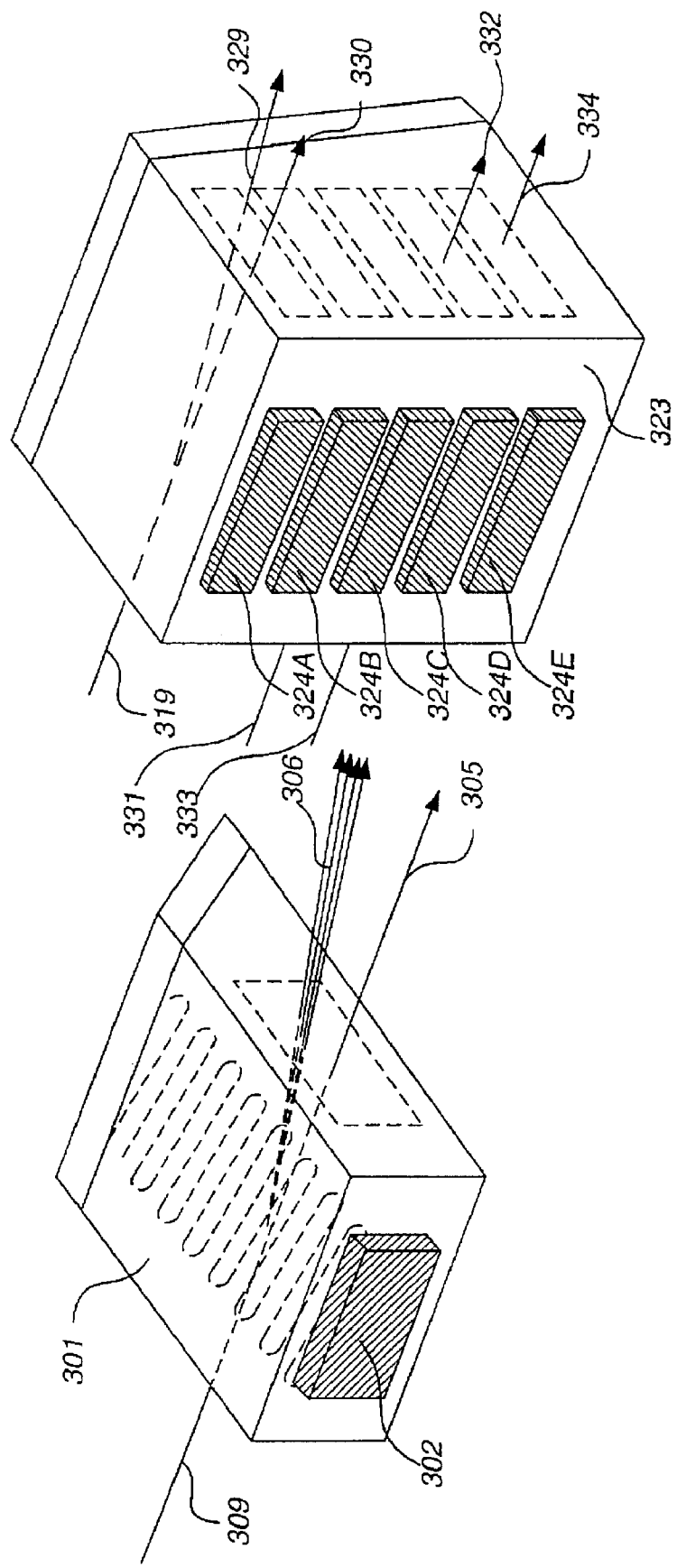

SYSTEM, METHOD AND ARTICLE OF MANUFACTURE FOR A BEAM SPLITTING ACOUSTO-OPTICAL MODULATOR

BACKGROUND

The present invention relates to laser beam direction and modulation and more specifically to a method and apparatus including an integrated laser beam splitter and modulator providing higher speed and increased efficiency.

Laser beams are often modulated for various uses. One example is direct imaging technology, such as a laser direct imaging (LDI) device for a printed circuit board (PCB) panel. LDI may be performed by scanning a laser beam across the surface of a PCB panel from one edge of the PCB panel to the other edge, along one or more scan lines. For examples of LDI systems and their use, see U.S. Pat. No. 5,895,581 to Grunwald (issued Apr. 20, 1999) entitled LASER IMAGING OF PRINTED CIRCUIT PATTERNS WITHOUT USING PHOTOTOOLS, and U.S. Pat. No. 5,328,811 to Brestel (issued Jul. 12, 1994) entitled METHOD OF PRINTING AN IMAGE ON A SUBSTRATE PARTICULARLY USEFUL FOR PRODUCING PRINTED CIRCUIT BOARDS. See also co-pending U.S. patent application Ser. No. 09/435,983 to Vemackt, et al. (filed: Nov. 8, 1999) now U.S. Pat. No. 6,396,561, entitled: METHOD AND DEVICE FOR EXPOSING BOTH SIDES OF A SHEET, assigned to the assignee of the present invention and incorporated herein by reference for all purposes. See also an automatic material handling system for a LDI device that is described in U.S. patent application Ser. No. 09/511,646 to Vernackt (filed Feb. 22, 2000) now U.S. Pat. No. 6,387,579 entitled A SYSTEM, METHOD AND ARTICLE OF MANUFACTURE FOR DIRECT IMAGE PROCESSING OF PRINTED CIRCUIT BOARDS, and assigned to the assignee of the present invention.

Because laser beam sources can be very complex and expensive, often a device that uses a laser beam source also divides or in some other manner splits the laser beam into one or more laser beams. Each separate laser beam can then be used for a separate application. In some applications multiple laser beams are required to accommodate a higher throughput of the system. For example, often the modulation speed of a laser beam is a limiting factor. To overcome the limited modulation speed, the laser beam is split into multiple laser beams. Each one of the multiple laser beams is then modulated with a portion of the modulation signal, thereby providing multiple, parallel channels of modulation data throughput. In other applications, the limiting factor may be a mechanical limitation. An example of a mechanical limitation is a rotating drum upon which the laser is used to create an image. To increase the throughput, the laser beam is divided into multiple laser beams and each of laser beams are applied to a portion of the drum, resulting in a faster imaging process on the drum.

An LDI device described above is typically used to apply an image to PCB panels. The PCB panels are coated with a photoresist material (photoresist). The photoresist can be any one of several materials well known in the art, for example Riston® Photoresist (E. I. du Pont de Nemours and Company, Research Triangle Park, N.C.) or Laminar® Photoresist (Morton Electronic Materials, Tustin, Calif.). In the industry it is believed that for a given photoresist, a given quantity of light energy E must be imparted to the photoresist to properly and completely expose or react the photoresist. This has been expressed in the form of a product of power of the light source and exposure time as expressed in Equation 1:

$$E = I \times t \qquad \text{Equation 1}$$

Where:
I=intensity of the UV light (mW/cm$^2$)
t=time of exposure (seconds)
E=energy (mJ/cm$^2$)
1W=1 J/s Several types of lasers may be suitable as a laser light source for exposing photoresist in a direct imaging process or similar imaging processes such as a photoplotter. A commonly used laser is a continuous wave (CW) ultraviolet (UV) laser having a relatively low power of 1 to 4 watts. Such lasers are typically UV gas-ion lasers, and are available from, for example, Coherent, Inc., Santa Clara, Calif., and Spectra-Physics Lasers, Inc. Mountain View, Calif. Solid state UV CW lasers are also currently being developed. Solid state UV CW lasers also have relatively low laser power. Other lasers include a visible laser source, an infrared laser source, or an HeNe laser source. A mode locked laser source that provides a repetition rate that is equal to or higher than the modulation data pixel rate can be considered as a quasi CW laser source and therefore can also be used.

With the relatively low laser energy level that such lasers provide, efficient use of the laser power is required so that adequate light energy E is imparted to the surface material such as photoresist. Thus there is a need for a method and apparatus for efficient laser beam directing, splitting and modulating.

SUMMARY OF THE INVENTION

A combined modulator and laser beam splitter device is disclosed. The combined device includes a crystal with a horizontal cross-sectional shape of a pentagon. The crystal includes a top surface, a bottom surface, and a first through fifth sides. The first side and the second side are substantially parallel. An absorber is mounted on the third side. The fourth and fifth sides are substantially opposite to the third side. The fourth and fifth sides form an angle substantially equal to 180 degrees minus the sum of a first and second Bragg angles. The crystal also includes at least one layer. For one embodiment, each layer includes an incident window on the first side, an active window on the second side and a transparent axis between the incident window and the active window. A first and a second transducer are mounted on the fourth and fifth sides.

For one embodiment, the crystal can also include multiple crystals that are formed such that at least two of the multiple crystals are molecularly bonded.

For another embodiment, the multiple crystals may be mounted to mechanical mounts such that the crystals may be mechanically aligned to substantially minimize any optical imperfections.

For one embodiment, a first and a second acoustic wave direction intersect the absorbing surface at an angle substantially equal to 90 degrees minus the Bragg angle. For another embodiment, the first and the second acoustic wave directions meet at an angle substantially equal to twice the Bragg angle.

For one embodiment, each one of the output laser beams include a proportionate share of the energy of the incident laser beam.

For one embodiment, the third side is substantially perpendicular to the first and second sides. For another embodiment, the third side also forms an acute angle with the bottom side.

BRIEF DESCRIPTION OF THE FIGURES

FIG. 3C illustrates a single channel AOM of another embodiment.

FIG. 3D illustrates a multi channel AOM of another embodiment.

DETAILED DESCRIPTION OF THE INVENTION

As will be described in more detail below, a method and apparatus of both modulating and beam splitting a laser beam in a single combination device is disclosed. The combined device includes a crystal with a horizontal cross-sectional shape of a pentagon. The crystal includes a top surface, a bottom surface, and a first through fifth sides. The first side and the second side are substantially parallel. An absorber is mounted on the third side. The fourth and fifth sides are substantially opposite to the third side. The fourth and fifth sides form an angle substantially equal to 180 degrees minus the sum of a first and a second Bragg angle. The crystal also includes at least one layer. For one embodiment, each layer includes an incident window on the first side, an active window on the second side and a transparent axis between the incident window and the active window. A first and a second transducer are mounted on the fourth and fifth sides.

Figure 1:
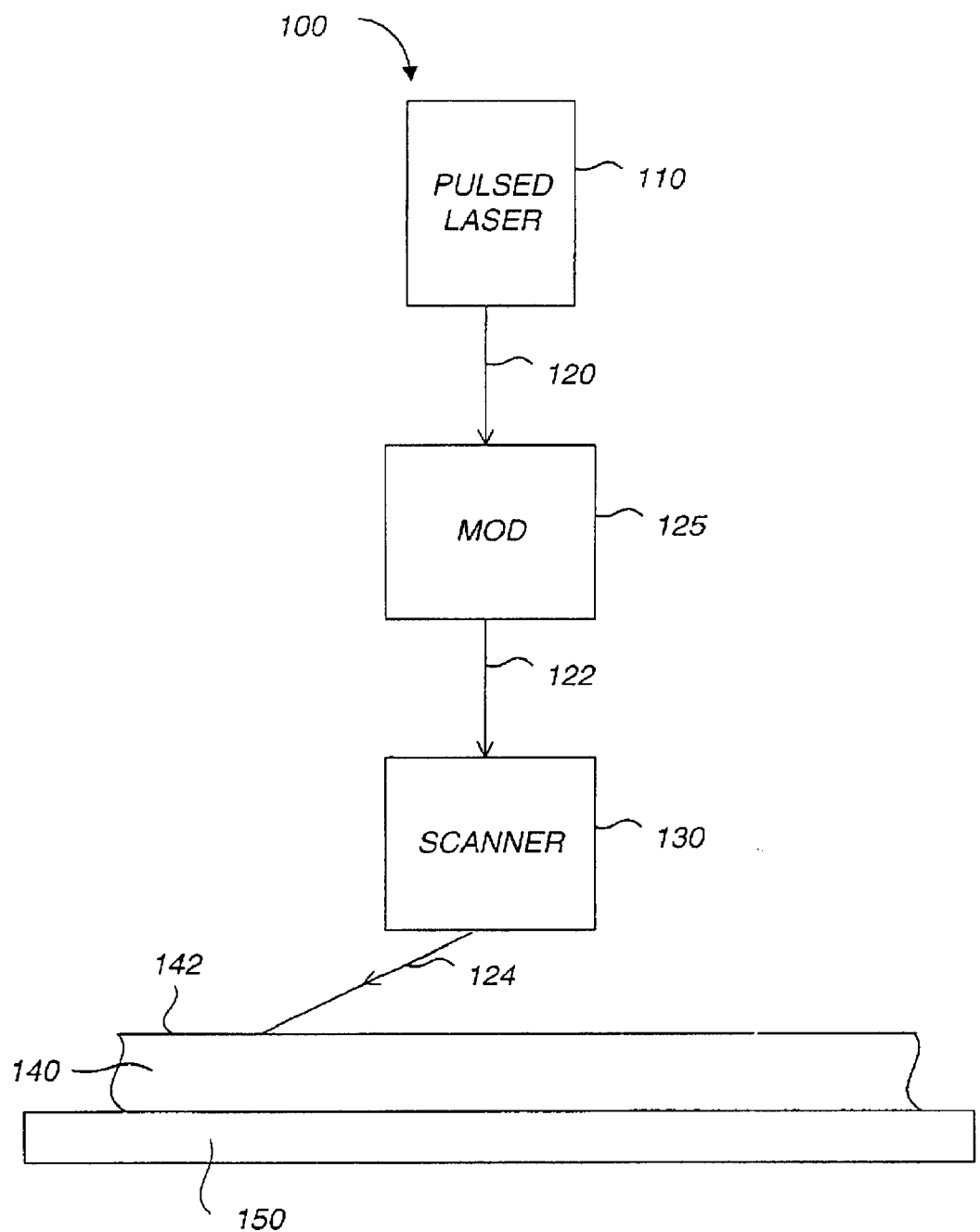
FIG. 1 illustrates a laser scanning device of one embodiment.

As shown schematically in FIG. 1, in one embodiment, a light source 110 is used for generating a light beam 120. Light source 110 of exposing apparatus 100 includes a laser, generating an incident laser beam 120 that is directed to optical scanning unit 130. The incident laser beam can be pulsed or continuous. The incident laser beam can be between 200 nm and 1100 nm wavelength. Optical switch 125 acting as a deflector and switch, directs the laser beam 122 to optical scanning unit 130. The light beam 120 is typically blocked after the optical switch 125. Ultimately, scanning unit 130 directs the laser beam 124 to the photosensitive layer 142 of panel 140, thereby exposing the photosensitive layer 142 during a pass or scan of the laser beam 124. The laser beam 124 is perpendicular to the panel 140 throughout the scanning process. Optical switch 125 in one embodiment is a laser beam deflector, in particular, an AOM as described in FIGS. 3A through 3D, below.

Figure 2:
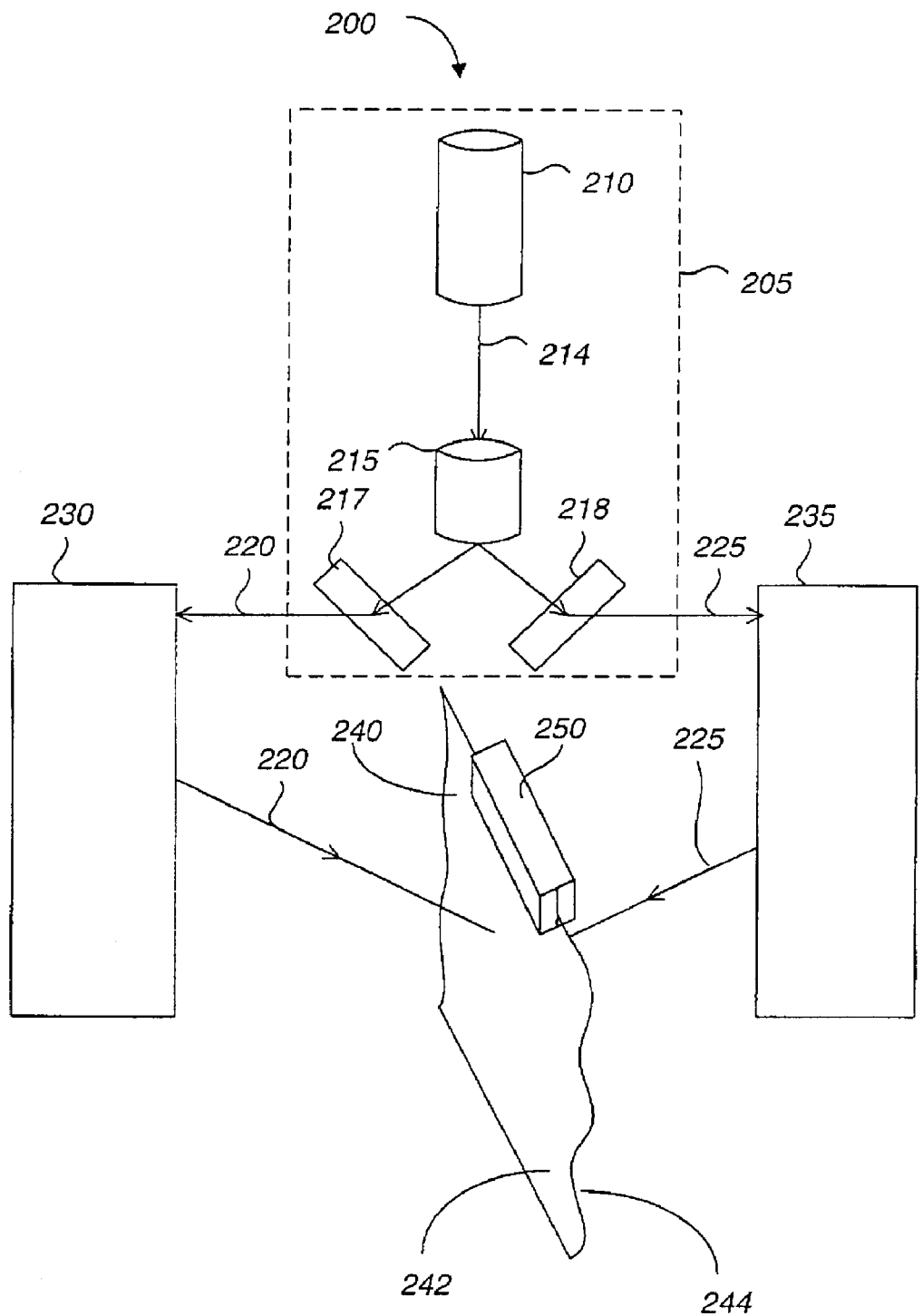
FIG. 2 illustrates a laser scanning device with a beam splitter of one embodiment.

Each laser beam source produces a laser beam with slightly different properties, i.e. wavelength, power and other properties. For some applications requiring two or more laser beams having very uniform laser beam qualities, a single laser beam source is used followed by a laser beam splitter so that both of the resulting laser beams have substantially identical properties. Also as described above, a switching limit or mode lock limit or other limitations may necessitate dividing the laser beam. FIG. 2 illustrates a dual side laser-scanning device of one embodiment as an example of a device having a single laser beam source and a laser beam splitter. One such laser-scanning device is described in above-mentioned co-pending U.S. patent application Ser. No. 09/435,983 to Vemackt, et al., entitled METHOD AND DEVICE FOR EXPOSING BOTH SIDES OF A SHEET, which is incorporated herein by reference in its entirety for all purposes.

As shown schematically in FIG. 2, in one embodiment, only one light source 210 is used for generating both laser beams 220 and 225. Light source 210 of optical system 205 of exposing apparatus 200, includes a laser source. The laser source generates an incident laser beam 214 which, alternately, is directed to optical scanning unit 230 and optical scanning unit 235, with the alternating switching carried out by an optical switch 215. The optical switch 215 acts as a deflector and split mirrors 217 and 218 direct the laser beams 220, 225 to optical scanning units 230 and 235, respectively. Ultimately, scanning units 230 and 235, respectively, direct or scan the two laser beams 220 and 225 toward the photosensitive layers 242, 244 on opposing surfaces of panel 240, thereby exposing both of the photosensitive layers 242, 244.

Split mirrors 217, 218 in one embodiment are two faces of a reflecting prism. The purpose of the split mirrors 217, 218 is to increase the angle of separation of the laser beams. In one embodiment the optical switch 215 is an AOM. An AOM provides rapid switching time and high efficiency i.e. transferring the maximum power of the laser beam to each optical scanning unit 230, 235. An AOM is particularly useful as a beam splitter when the optical scanning units 230, 235 are being multiplexed because the rapid switching speed of the AOM allows for almost exactly 50% of the time, the laser beam is being applied to each of the optical scanning units 230, 235. Unfortunately, the two laser beams output by a typical AOM are the zero order laser beam and a first order laser beam. The zero order laser beam includes substantially 100% of the power of the incident laser beam 214 and the first order laser beam includes only approximately 85% of the incident laser beam 214. Using a typical AOM and the split mirrors 217, 218 results in uneven power applied to one of the optical scanning units 230, 235. Additional components, such as an attenuator (not shown), are required to even out the laser beam power. Another disadvantage is that when the first order laser beam is selected, approximately 15% of the laser beam power is still produced in the zero order laser beam path. The remaining 15% power must also be absorbed or wasted in some other manner. In an alternative embodiment, the split mirrors 217 and 218 and optical switch 215 can be combined into a more efficient AOM such as those described in FIGS. 4A through 6, below.

Figure 3B:
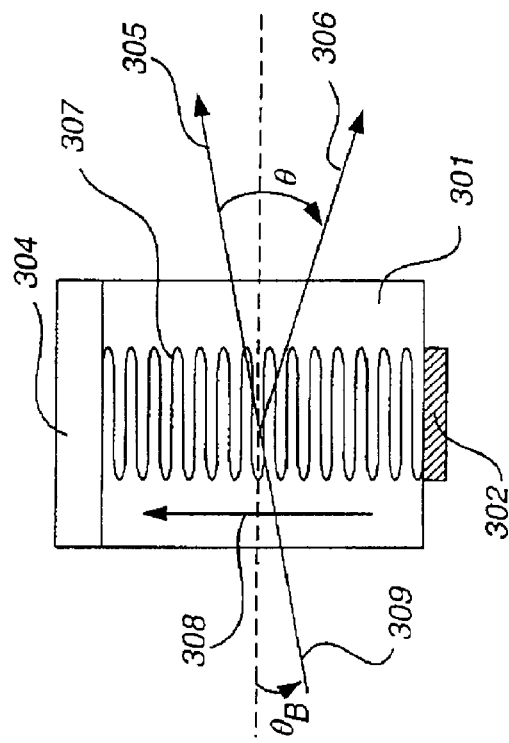
FIGS. 3A–3B illustrate an AOM of one embodiment.
Figure 3A:
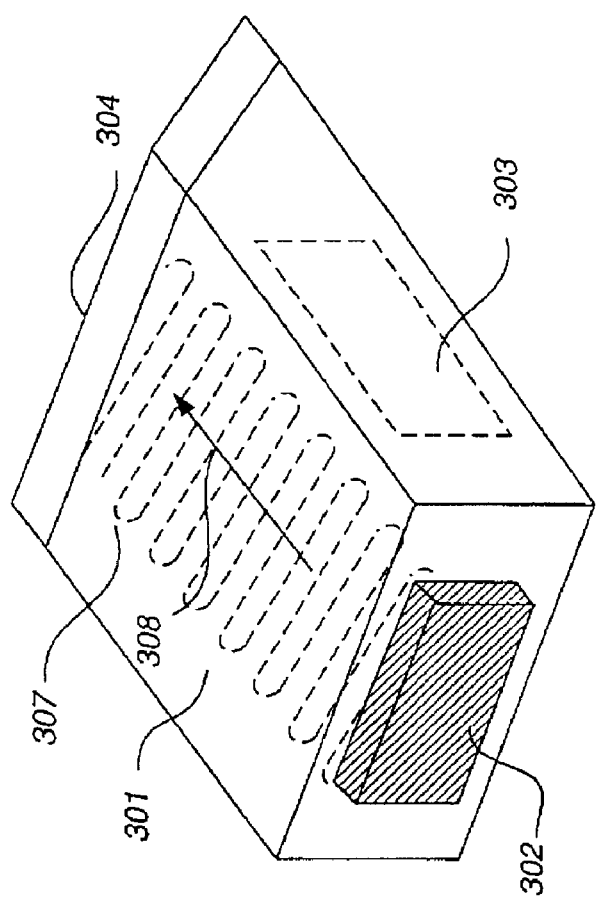

FIGS. 3A–3B illustrate the basic operating principle of an AOM. The basic principle of AOMs is that a transparent medium subject to a stress undergoes a change in the index of refraction. When the stress is associated with a high frequency sound wave, such as might be produced by a piezoelectric RF transducer 302, the change in refraction is periodic. The periodic refraction pattern can act as a diffraction grating producing what is known as Bragg diffraction. The undiffracted laser beam is called the zero order laser beam and the primary diffracted beam is called the first order laser beam. The first order laser beam may be on either side of the zero order laser beam. For this reason, the first order laser beams are typically referred to as a −1 or +1 order laser beam. The optical alignment of the AOM crystal toward the sound wave inside the crystal determines which first order, −1 or +1, is output.

The required angle theta (θ) for the intersection of the high frequency sound wave and the incident laser beam 309 is called the Bragg angle which is given by:

$$\theta = (½) * (\lambda / \Lambda) \qquad \text{Equation 2}$$

where $\Lambda$ is the acoustic wavelength and $\lambda$ is the optical wavelength. The acoustic wavelength is determined by the ratio of the velocity of sound in the crystal to the frequency:

$$\Lambda = v/f \qquad \text{Equation 3}$$

An example of a calculation of a Bragg angle for a CO2 laser $\lambda$=9.2 microns, a germanium crystal and a 40 MHZ transducer is as follows. The velocity of sound of $5.5*10^5$ cm/sec for germanium is available from tables. Thus:

$$\Lambda = (5.5 * 10^5)/(40 * 10^6) = 1.38 * 10^{-2} \text{ cm}$$

and the Bragg angle theta (θ) is:

$$\theta = (½)*(9.2 *10^{-4} \text{ cm})/(1.38 * 10^{-2} \text{ cm}) = 33 \text{ milliradians or approximately 2 degrees}$$

The Bragg angle is typically between 1 and 20 degrees, although larger and smaller angles are also possible.

Referring now to FIGS. 3A–3B, an AOM includes an AOM crystal 301. A RF transducer 302 is attached to the AOM crystal 301. The RF transducer 302 is typically a piezoelectric device that is attached to the AOM crystal 301 by adhesive or mechanical means. The RF transducer 302 is controlled by a modulating RF or video signal from a modulating signal source not shown. Both amplitude and frequency modulation of modulating RF or video signal driving the RF transducer 302 is possible using standard techniques.

An active window 303 of the AOM crystal 301 is where optimum interaction of the laser light and RF sound occurs. An absorbing surface 304 reduces RF back reflections inside the AOM crystal 301. The absorbing surface 304 can be positioned at an oblique angle to further minimize the RF back reflections toward to transducer 302. A zero order laser beam 305 follows the path of the incident laser beam 309 input to the AOM. A first order (+1 order) diffracted laser beam 306 exits the AOM crystal 301 at a certain Bragg angle θ of deflection. An acoustic wave 307, inside the AOM crystal 301, travels in the acoustic wave direction 308. As described above, the Bragg angle of deflection is a function of the laser wavelength, the frequency and direction of acoustic wave 307, and the crystal material. The +1 order laser beam 306 is typically used for imaging. The zero order laser beam 305 can also be used in some applications where approximately 100% of the incident laser beam 309 power is needed such as a thermal applications. When the zero order laser beam 305 is used for imaging, deflecting the laser beam to create the +1 order laser beam 306 is the "off" or non-imaging state.

The +1 order laser beam 306 is turned on (i.e., the incident laser beam 309 deflected to generate the first order beam) or not according to the modulation data applied to the RF transducer 302. The modulation data is transformed into wavefronts within the AOM crystal 301 that move at an acoustic speed 307 within the AOM crystal 301. This results in an image on the imaging surface, e.g., on the surface of a PCB panel, that moves at a velocity related to the magnification of the optical system of the laser beam between the AOM and the surface of the panel being imaged, and to the acoustic speed within the AOM.

An AOM device can also be used to switch the laser light on/off going towards a laser sensitive medium as described above. AOM devices can be configured as a monobeam or multibeam. Examples of such multibeam devices are shown in FIGS. 3C–D below. Multibeam technology improves the throughput of a laser device, where, for example, mechanical restrictions such as turning speed of a drum apply.

A mono crystal/transducer AOM is illustrated in FIG. 3C and includes the undeflected original (the zero order) laser beam 305. The incident laser beam 309 is deflected by a mixed RF signal applied to the transducer to generate a several deflected beams 306 that are each used for imaging. Each of the components of the mixed RF signals modulates the particular deflected beam. Each of the deflected laser beams includes a proportionate share of the power of the incident laser beam 309. For example, if there are four deflected laser beams 306, then each of the four deflected laser beams includes approximately 25% of the 85% power of the incident laser beam 309.

Alternatively, a stacked transducer with a single crystal configuration is possible as shown in FIG. 3D. Several incident laser beams 319, 331, 333 are used. Each of the incident laser beam 319, 331, 333 originates from different laser source or from a laser beam splitter (not shown). Zero order laser beams 330, 332 and 334 are shown. Each incident laser beam 319, 331, 333 is deflected or not, and one deflected laser beam 329 is shown, and is generated if transducer 324a is activated with a RF signal. Similarly, other laser beams (e.g., laser beams 332 and 334) are deflected according to whether or not their respective transducers 324d–324e are activated with a RF signal. The RF signal is modulated and is supplied from an RF driver/amplifier (not shown).

Laser beam modulators such as AOMs are typically, approximately 85% efficient, i.e. 85% of the laser power of the incident laser beam applied to the input of an AOM is output from the AOM in the first order laser beam and approximately 15% of the power remains in the zero order laser beam. The AOMs can also have some internal losses in the crystal but the losses are minimized by using coated facets on the crystal and other similar techniques. Laser beam splitters such as prisms are typically, approximately 85% efficient. Therefore a system that includes both a laser beam splitter and a modulator in series such as described above in FIG. 2 above, has an overall efficiency of approximately 85% * 85% =72% of the incident laser beam power.

Figure 3E:
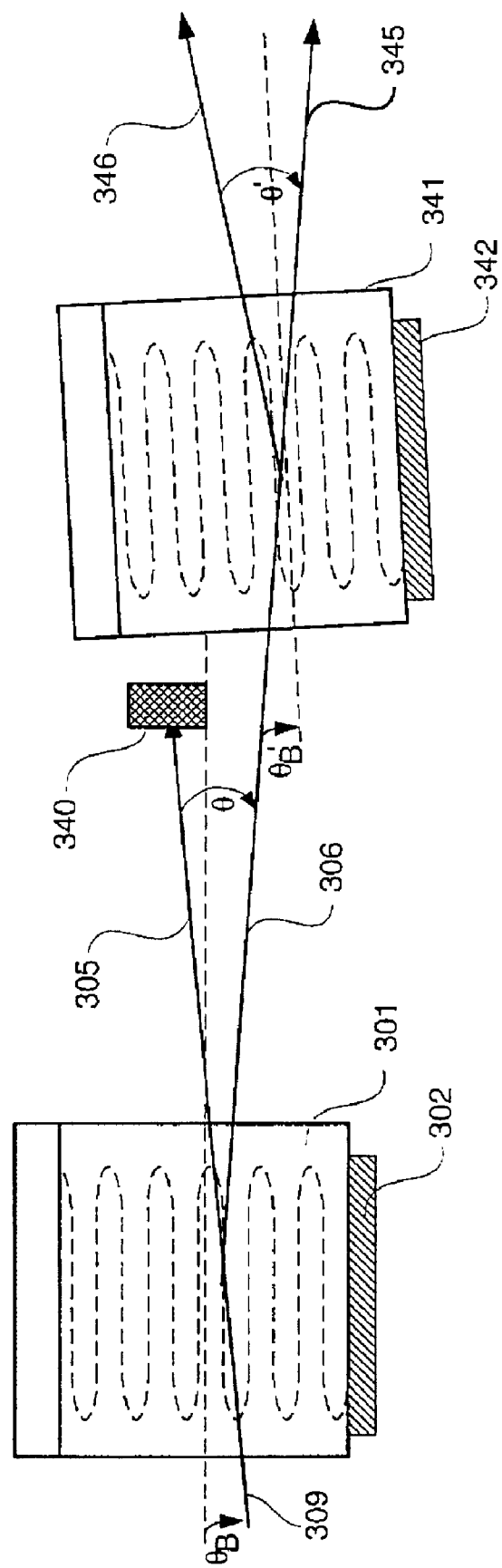
FIGS. 3E and 3F illustrate multiple single channel AOMs in series.
Figure 3F:
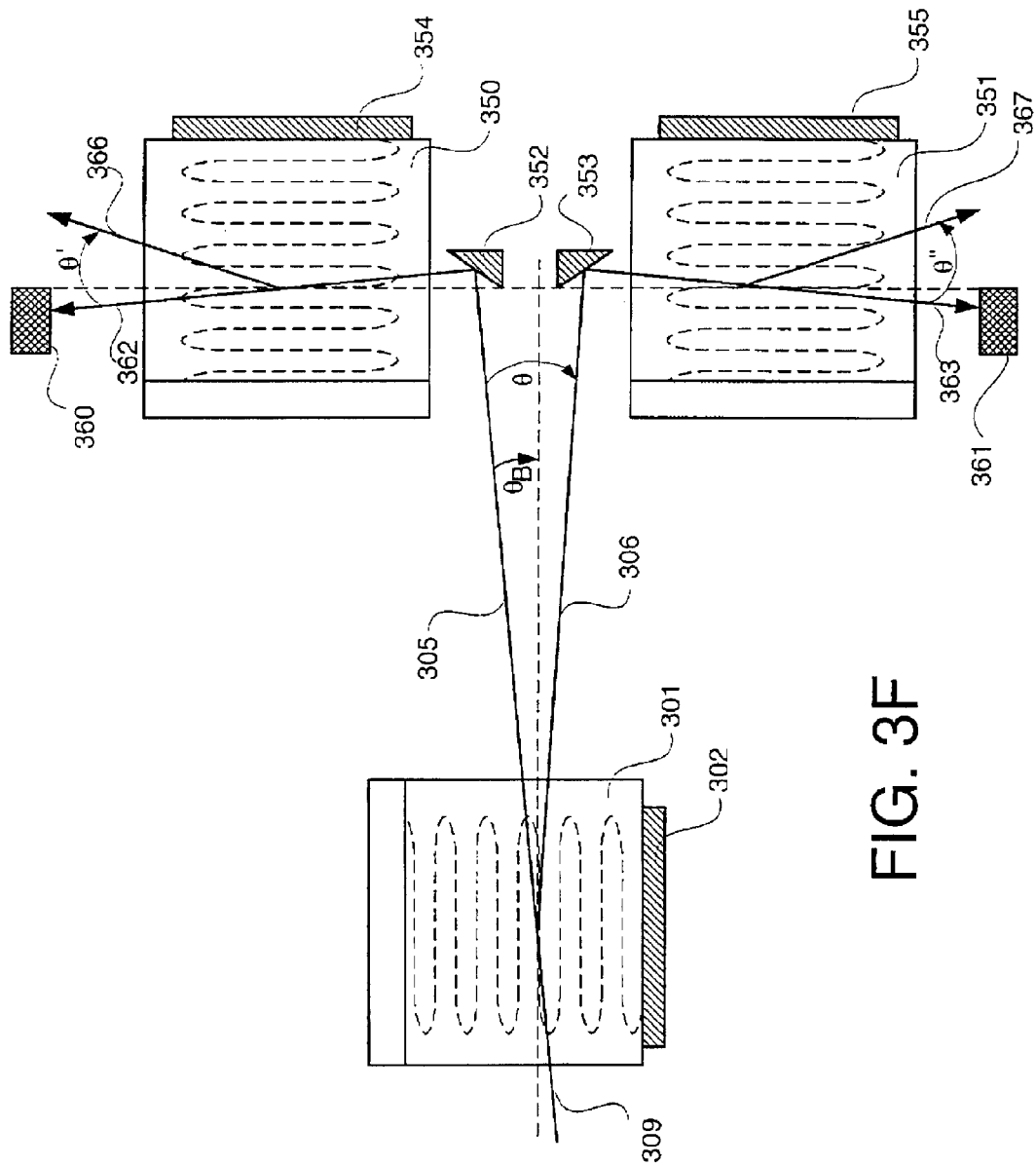

FIGS. 3E and 3F illustrate two combinations of AOMs in series for splitting, directing and modulating laser beams. In FIG. 3E, incident laser beam 309 is applied to a first AOM 301. Initially, a zero order laser beam 305 is output from the AOM 301. The zero order laser beam 305 is directed to an absorber block 340 because, in this particular application, the zero order laser beam 305 is not used. In alternate embodiments, the zero order laser beam 305 could be used. When a modulation signal is applied to the first transducer 302, the +1 order laser beam 306 is created. The zero order laser beam 305 continues at approximately 15% power and is absorbed in the absorber 340. The +1 order laser beam 306 is deflected a certain Bragg angle θ and is applied to the second AOM 341. In the initial state, a zero order laser beam 345 is output from the second AOM 341. When a modulation signal is applied to the second transducer 342, the +1 order laser beam 346 is created. The zero order laser beam 345 continues at approximately 15% power and is also output. The +1 order laser beam 346 is deflected a certain Bragg angle θ'. The +1 order laser beam 346 includes approximately 72% of the power of the incident laser beam 309. In one embodiment, the modulation signal applied to transducer 342 switches the laser light from one optical scanning unit (not shown) to another. The modulation signal applied to transducer 302 can also contain the imaging information data.

FIG. 3F illustrates three AOMs used in combination such as may be used in a multiplexing application. Incident laser beam 309 is applied to a first AOM 301. Initially, a zero order laser beam 305 is output from the AOM 301. The zero order laser beam 305 is directed to a reflecting mirror 352 and then applied to a second AOM 350. When a modulation signal is applied to the first transducer 302, the +1 order laser beam 306 is created. The zero order laser beam 305 continues at approximately 15% power. The +1 order laser beam 306 is directed to a reflecting mirror 353 and then applied to a third AOM 351. Initially, the zero order laser beam 362 is output from the second AOM 350. The zero order laser beam 362 is not used and is therefore directed to a absorber 360. When a modulation signal is applied to the second transducer 354, a +1 order laser beam 366 is created. The first order laser beam 366 includes approximately 100% * 85%= 85% of the incident laser beam 309 power. Initially, the third AOM outputs a zero order laser beam 363 that is not used and is directed to an absorber block 361. When a modulation signal is applied to both the first transducer 302 and the third transducer 355, the +1 order laser beam 367 is created. The +1 order laser beam 367 includes 85% * 85%=72% of the incident laser beam 309 power. As shown in FIG. 3F, the first AOM 301 is used to switch between two optical systems i.e. multiplexing two optical systems. The second and third AOMs 350, 351 are typically used to modulate the laser beams for the two optical systems. Again, typically +1 order laser beam 366 will be attenuated by an attenuator (not shown) to the same power level as +1 order laser beam 367, so that both laser beams 366 and 367 have an equal amount, approximately 72%, of the incident laser beam 309 power.

Figure 4A:
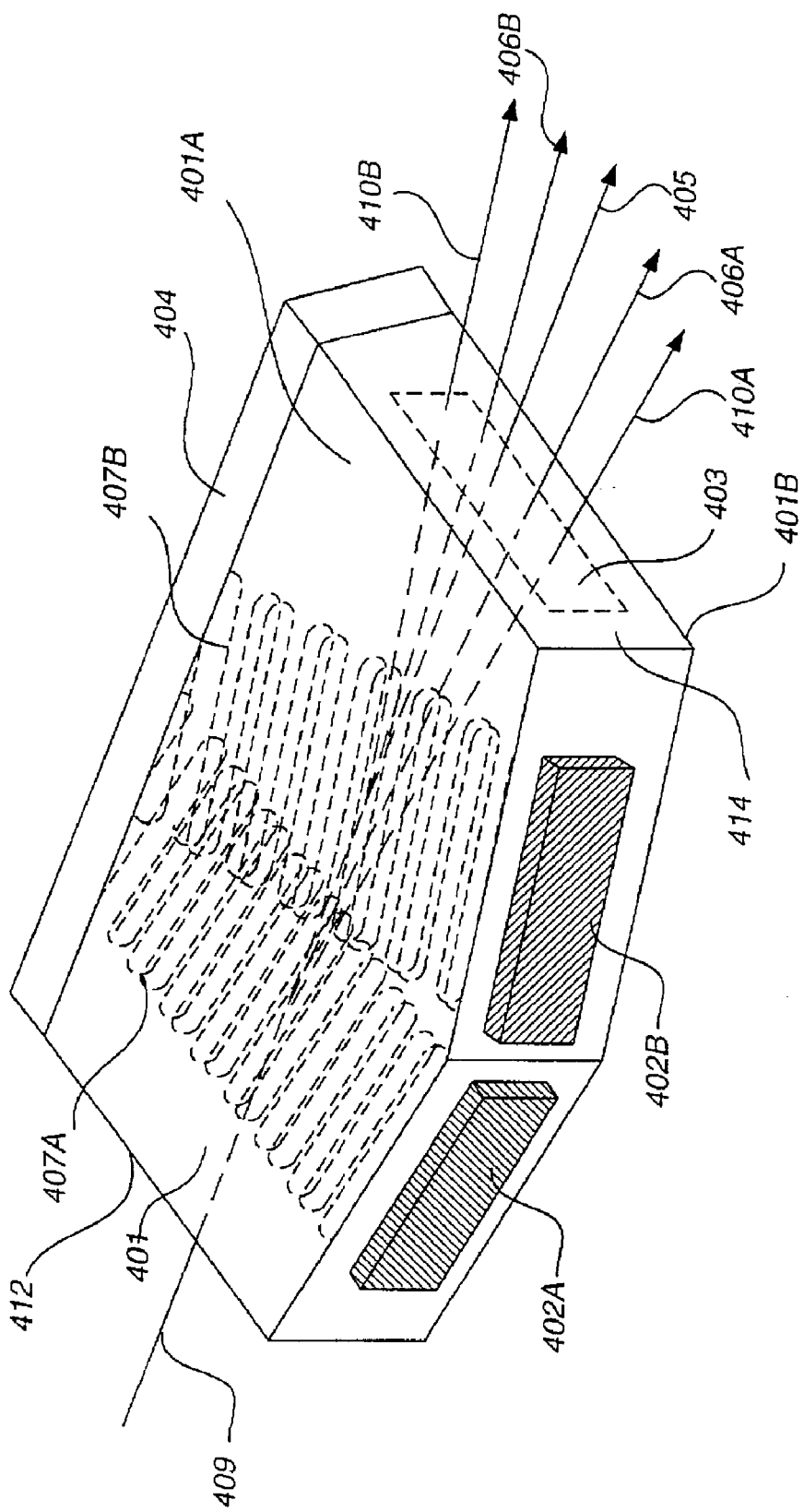
FIGS. 4A and 4B illustrate a single channel combined laser beam modulator and beam splitting device of one embodiment.
Figure 4B:
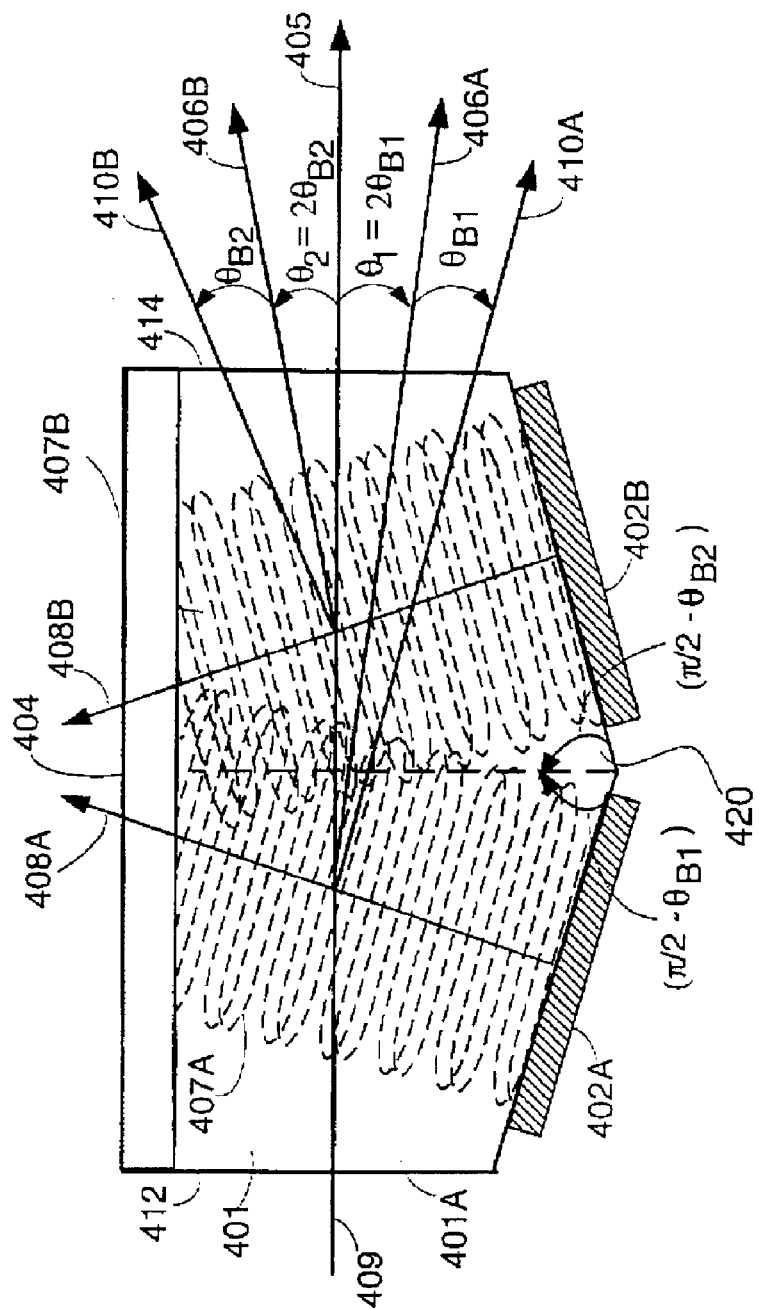

FIGS. 4A and 4B illustrate a single layer, combined acousto-optical modulator and laser beam splitter of one embodiment. The combined AOM and laser beam splitter includes an AOM crystal 401. A first RF transducer 402A is attached to the AOM crystal 401. A second RF transducer 402B is also attached to the AOM crystal 401. The first and second RF transducers 402A, 402B are aligned with an incident laser beam 409 such that the incident laser beam 409 will pass through a region of the crystal 401 that include the first and second acoustic waves 407A, 407B, and onward to an active window 403. The active window 403 of the AOM crystal 401 is where optimum laser light/RF sound interaction occurs. An absorbing surface 404 reduces RF back reflections inside the AOM crystal 401.

A zero order diffracted laser beam 405, and +1 order and −1 order laser beams 406A, 406B exit the AOM crystal 401. A first acoustic wave 407A inside the AOM crystal 401 travels in a first acoustic wave direction 408A. A second acoustic wave 407B inside the crystal travels in a second acoustic wave direction 408B. The +1 order and −1 order laser beams 406A, 406B are used for scanning while the zero order laser beam 405 is typically blocked after exiting the AOM. The first order laser beam 406A is turned on (i.e., the incident laser beam 409 is deflected to generate the first order beam 406A) or not according to the modulation data applied to the RF transducer 402A. The modulation data is transformed into wavefronts within the AOM crystal 401 that move at an acoustic speed 407A within the AOM crystal 401. Similarly, the first order laser beam 406B beam is turned on or not according to the modulation data applied to the RF transducer 402B. The modulation data is transformed into wavefronts within the AOM crystal 401 that move at an acoustic speed 407B within the AOM crystal 401. In one embodiment, the modulation data applied to the transducers 402A, 402B are used in a multiplexed mode, i.e. only one transducer is active at a time.

The top 401A and bottom 4011B surfaces of the crystal 401 are planar and, in one embodiment, are substantially parallel. In one embodiment, the incident side 412 is substantially parallel to the exit side 414 so that a transparent axis exists between the incident side 412 and the active window 403 that the zero order laser beam 405 can follow. In another embodiment, the incident side 412 is not substantially parallel to the exit side 414 which provides a narrower transparent axis between the incident side 412 and the active window 403 that the zero order laser beam 405 can follow. The transparent axis is a region of transparency in the crystal 401 such that the incident laser beam 409 may be applied at a range of angles and have a direct line or a direct diffracted path from the incident side 412, through the crystal 401, through the first and second acoustic waves 407A, 407B, to the active window 403. In one embodiment, the incident side 412 and the exit side 414 are substantially perpendicular to the top 401A and bottom 4011B surfaces.

In one embodiment, the absorbing surface 404 is substantially perpendicular to the incident 412 and the exit 414 sides as shown in a top view in FIG. 4B. The absorbing surface 404 forms an acute angle with the bottom surface 401B and an obtuse angle (between 90 degrees and 180 degrees) with the top surface 401A as shown in FIG. 4A. In one embodiment, the absorbing surface 404 is oriented at an angle such that a reflected acoustic wave is reflected away from the transparent axis. For example, the absorbing surface 404 could be oriented at an angle relative to the transparent axis such that a reflected acoustic wave is reflected at an angle such as less than 45 degrees or greater than 135 degrees. Other similar angles and ranges of angles could also be used as long as the reflected acoustic wave is directed away from the portion of the transparent axis where the acoustic wave initially diffracts the incident laser thereby minimizing any interference of the diffraction. In another embodiment, the absorbing surface 404 is oriented at an angle such that a reflected acoustic wave is reflected away from the active window. For example, the absorbing surface can be oriented at an angle such that a reflected acoustic wave is reflected toward the top 401A or bottom 401B surfaces of the crystal rather than toward the exit side 414 or toward the transparent axis.

In one embodiment, the transducers 402A, 402B are oriented such that the first and second acoustic wave directions 408A, 408B intersect the transparent axis at an acute angle. The first and second acoustic wave directions 408A, 408B also intersect the absorbing surface 404 at an angle substantially equal to 90 degrees minus the respective Bragg angle $\theta_{B1}$ or $\theta_{B2}$. The first and second acoustic wave directions 408A, 408B meet at an angle substantially equal to the sum of the respective Bragg angles $\theta_{B1}$ and $\theta_{B2}$.

In one embodiment, the absorbing surface 404 is substantially opposite the transducers 408A, 408B so that the absorbing surface 404 substantially absorbs the acoustic waves 407A, 407B. Therefore interference caused by the first acoustic wave 407A reflecting into the second acoustic wave 407B is substantially eliminated. The absorbing surface 404 also similarly prevents the second acoustic wave 407B from interfering with the first acoustic wave 407A.

In an alternate embodiment, the absorbing surface is not included. For example, the surface 404 which is opposite the transducer 402A is substantially perpendicular to the top 401A and bottom surface 401B. In still another embodiment, the transducer 402B is mounted on the surface 404 such that the transducers 402A, 402B are arranged symmetrically to the transparent axis, ie the transparent path from the incident window to the active window. In still another embodiment, the surface 404 forms an obtuse angle to the incident surface 412 and an acute angle to the active window 414.

In an alternate embodiment, the crystal 401 can include multiple crystals. For example, the crystal 401 could include two crystals that are precisely formed so as to form a so-called molecular bond, such as along the bond line 420 shown in FIG. 4B. Manufacturing multiple smaller crystals and then combining the smaller crystals together can often provide a more cost effective and/or more easily manufactured device than using one, larger crystal, such as crystal 401. The molecular bond is a joint between the two crystals such that the combined crystals interact with a laser beam as a single crystal.

In another alternate embodiment, the multiple crystals may not be molecularly bonded but instead, at least two of the crystals are mounted to mechanical mounts such that the crystals may be mechanically aligned to substantially minimize any optical imperfections. Manufacturing processes may cause optical imperfections. The crystals must also be aligned to minimize focal length and laser spot diameter. For one embodiment the mechanically aligned crystals are approximately 1 millimeter (mm) apart. Alternatively, the crystals may be more or less than 1 mm apart.

The single combination device described in FIG. 4A above is approximately 85% efficient while providing both modulation and division of the incident laser beam 409. Therefore, a laser beam scanning system using such a combination device is approximately 13% (85% versus 72% of the power in the incident laser beam 409) more efficient than a laser beam scanning system that uses a modulator and a laser beam splitter in series such as described in FIGS. 3E and 3F. Another advantage is that using a single optical device in an optical system is simpler and easier to align and therefore provides a less costly solution.

The single combination device described in FIGS. 4A and 4B above also results in a separation between the two first order laser beams 406A, 406B equal to twice the sum of the two Bragg angles $\theta_{B1}$ and $\theta_{B2}$. Similarly, given a different modulation signal to the transducers 402A and 402B, second order (+2, −2 order) laser beams 410A, 410B are output. The second order laser beams 410A, 410B and separated additional Bragg angles $\theta_{B1}$ and $\theta_{B1}$ respectively, from the first order laser beams 406A, 406B. This combination device is particularly useful for providing additional separation between the output laser beams 410A, 410B, 406A, 406B. The additional separation angle can also, in certain applications, eliminate the need of additional reflecting mirrors such as the reflecting mirrors 352, 353 shown in FIG. 3F. Each of the first order laser beams 406A, 406B are therefore equal in power and therefore more easily utilized in that no further attenuation is required down stream to provide even power from the beams.

Figure 5:
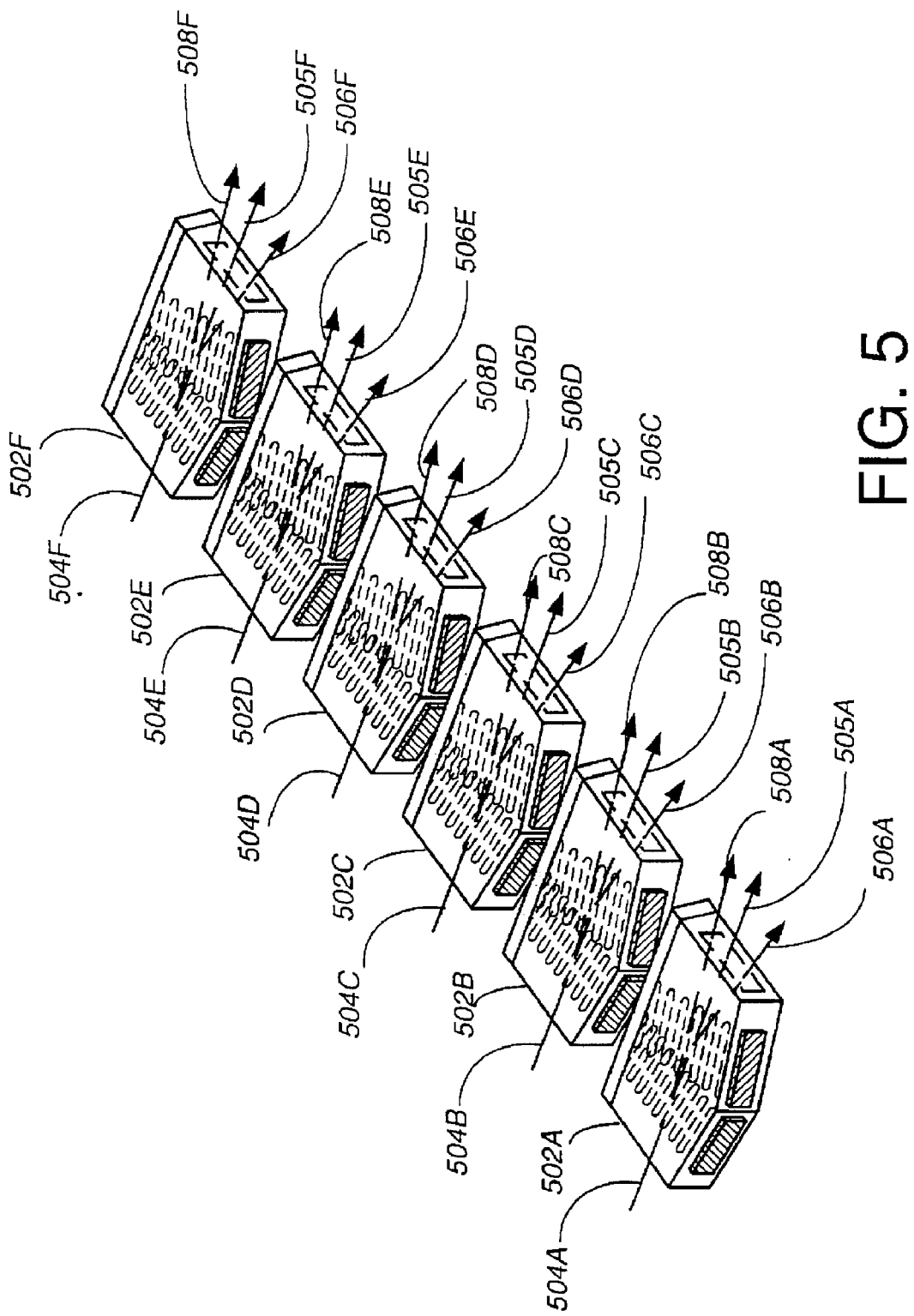
FIG. 5 illustrates multiple, single-channel combined laser beam modulator and beam splitting devices arranged in parallel.
Figure 6:
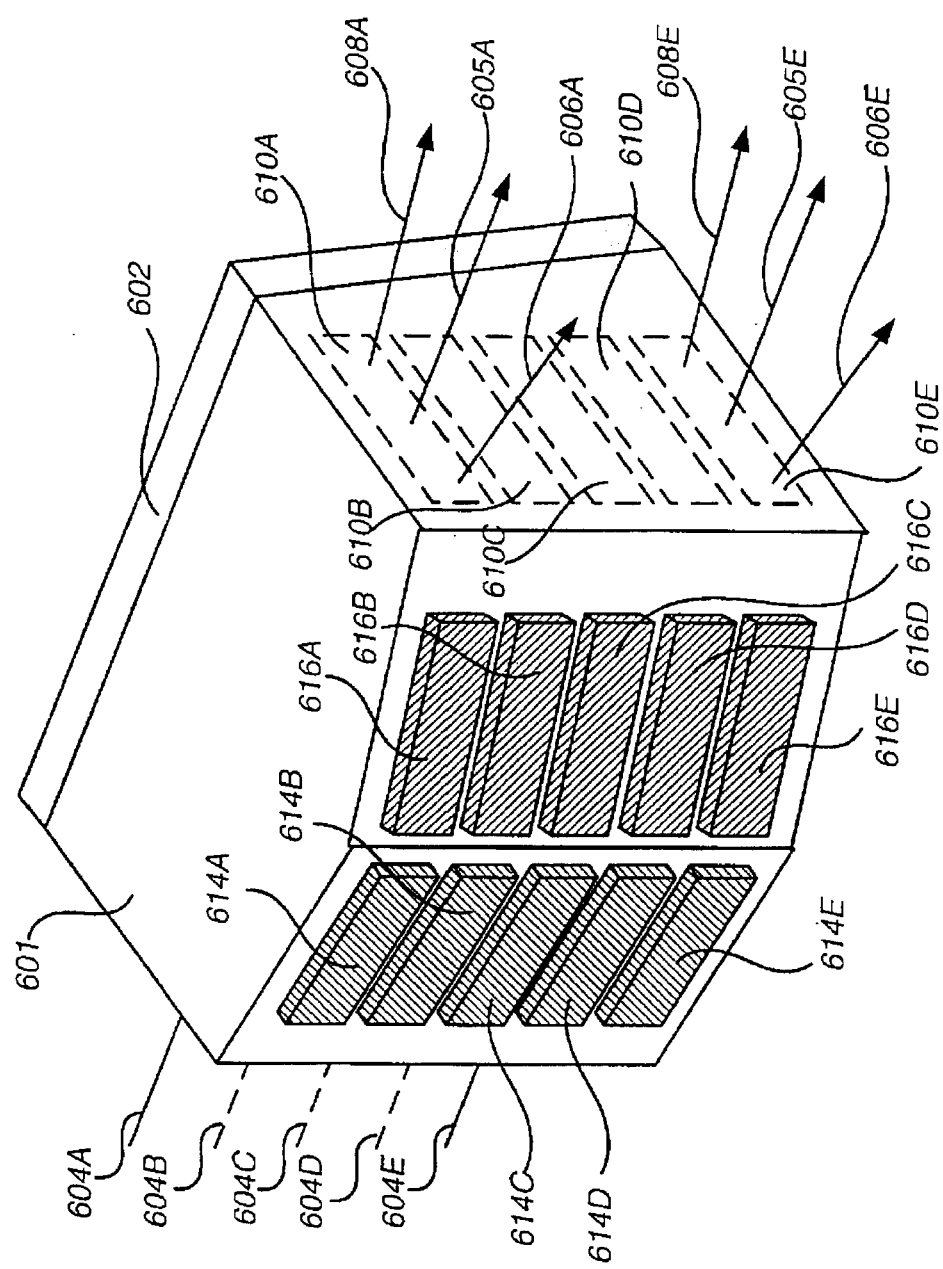
FIG. 6 illustrates a multi-channel combined laser beam modulator and beam splitting device of one embodiment.

FIGS. 5 and 6 illustrate two embodiments of multi-beam or multi-channel applications of a combined acousto-optical modulator and laser beam splitter. As shown in FIG. 5, several, combined acousto-optical modulator and laser beam splitters are arranged in parallel. A separate incident laser beam 504A–504F is applied to a corresponding one of the combined acousto-optical modulator and laser beam splitters 502A–502F. Zero order laser beams 505A–505F and first order laser beams 506A–506F and 508A–508F are output from the corresponding one of the combined acousto-optical modulator and laser beam splitters 502A–502F.

FIG. 6 illustrates a similar multi-beam embodiment where the one large crystal 601 includes five layers, where each layer can split and modulate a corresponding one of five incident laser beams 604A–E. The crystal 601 is a similar shape as the crystal shown in FIGS. 4A–4B except that for one embodiment, the crystal 601 is thicker to accommodate the multiple incident laser beams 604A–E. In an alternative embodiment, the crystal 601 can include multiple smaller crystals that are molecularly bonded such as described above in FIGS. 4A and 4B.

An absorbing surface 602 is also included to absorb energy from the transducers 614A–E and 616A–E. Zero order laser beams 605A–E and first order laser beams 606A–E and 608A–E are output from respective active windows 610A–610E. Although, second and subsequent order laser beams are not shown, such second and subsequent order laser beams could also be produced in this embodiment and in other embodiments described herein. Note that several of the first order beams 606A–E and 608A–E are not shown to simplify the FIG. 6 and reduce clutter, however the first order beams that are not shown are understood to be output.

In an alternative embodiment, the devices described in FIG. 4A through FIG. 6 above may be used so that the number of active writing laser beams can be selected dynamically, without readjusting the optics by an operator. For example, 1–5 (or more) laser beams may be selected simply by adjusting the modulation signal to the transducers. Sometimes the choice of the number of laser beams is needed because the sensitivity of the exposing surface (i.e. photoresist) can vary. Such a dynamic number of beam selection allows one imaging device, such as shown in FIGS. 1 and 2 above, to accommodate high or low sensitive photoresist by selecting a corresponding lower energy (more laser beams) or higher energy (fewer laser beams) in the writing laser beam(s). Such an embodiment reduces losses of laser power over prior art approaches, and the total energy is distributed equally over the number of selected laser beams by applying the correct RF power signal to the transducers.

In another embodiment, two devices such as described in FIGS. 4A–4B above are used in series to create an array such as for example, a 2×5 array. In still another embodiment, as described above, if an ML laser source is used and where the modulation data rate would exceed the ML repetition rate, then multiple writing laser beams are needed. Each of the laser beams forms a separate writing channel. For most applications, the ML repetition rate must be equal to or greater than the modulation data rate in an imaging application. In some applications, the modulation data rate can exceed the ML repetition rate if the resulting error rate is compensated for and/or below an acceptable error tolerance.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A laser direct imaging device comprising:
    a laser source;
    a combined modulator and laser beam splitter wherein the combined
    modulator and laser beam splitter includes:

a crystal, wherein the crystal includes:
  a top surface and a bottom surface;
  a horizontal cross-sectional shape of a pentagon including:
    a first side and a second side wherein the first side and the second side are substantially parallel;
    a third side wherein the third side is substantially perpendicular to the first and second sides and wherein the third side forms an acute angle with the bottom surface and wherein an absorber is mounted on the third side;
    a fourth side and a fifth side, wherein the fourth and fifth sides are substantially opposite to the third side; and
  a plurality of layers wherein each one of the plurality of layers includes:
    an incident window on the first side;
    an active window on the second side and a transparent axis between the incident window and the active window; and
    a first and second transducers wherein the first and second transducers are mounted on the fourth and fifth sides and wherein the fourth and fifth sides form an angle substantially equal to 180 degrees minus the sum of a first and a second Bragg angle; and a plurality of optical scanning units oriented to receive a first diffracted laser beam from the combined modulator and laser beam splitter and oriented to project the first diffracted laser beam to a receiving surface.

2. The laser direct imaging device of claim 1 wherein the receiving surface is a panel having two opposing surfaces and wherein at least one of the plurality of optical scanning units is oriented to the to project the first diffracted laser beam to each one of the two opposing surfaces.

3. An acousto optical modulation assembly comprising:
  at least two crystals, wherein at least two crystals are molecularly bonded and wherein the molecularly bonded crystals are transparent along an axis for light of a selected wavelength and wherein the molecularly bonded crystals have at least a first and a second mounting face which are oriented symmetrically to the axis; and
  at least two transducers, wherein the transducers produce acoustic waves from electrical signals, attached to the two mounting faces, the transducers being oriented so that the acoustic waves from the first and second transducers will intersect the axis.

* * * * *

UNITED STATES PATENT AND TRADEMARK OFFICE
CERTIFICATE OF CORRECTION

PATENT NO. : 6,674,564 B2
DATED : January 6, 2004
INVENTOR(S) : Vernackt et al.

It is certified that error appears in the above-identified patent and that said Letters Patent is hereby corrected as shown below:

Column 4,
Line 7, change "Vemackt" to -- Vernackt --.

Column 8,
Line 8, change "4011B" to -- 401B --.

Signed and Sealed this

Sixth Day of July, 2004

JON W. DUDAS
*Acting Director of the United States Patent and Trademark Office*